(12) United States Patent
Yang et al.

(10) Patent No.: US 7,248,317 B2
(45) Date of Patent: Jul. 24, 2007

(54) TRANSFLECTIVE DISPLAY PANELS AND METHODS FOR MAKING THE SAME

(75) Inventors: Kuen-Shien Yang, Kaohsiung (TW); An Shih, Changhua Hsien (TW); Tehsin Lee, Dongshan Township, Yilan County (TW); Elmer Chang, Toufen Township, Miaoli County (TW)

(73) Assignee: Toppoly Optoelectronics Corporation (TW)

( * ) Notice: Subject to any disclaimer, the term of this patent is extended or adjusted under 35 U.S.C. 154(b) by 307 days.

(21) Appl. No.: 11/110,846

(22) Filed: Apr. 21, 2005

(65) Prior Publication Data

US 2006/0238676 A1    Oct. 26, 2006

(51) Int. Cl.
*G02F 1/1335* (2006.01)
*H01L 21/00* (2006.01)

(52) U.S. Cl. ........................................ 349/114; 438/30
(58) Field of Classification Search ................ 349/113, 349/114; 438/30
See application file for complete search history.

(56) References Cited

U.S. PATENT DOCUMENTS

| 2004/0252262 | A1* | 12/2004 | Park | 349/114 |
| 2005/0140868 | A1* | 6/2005 | Hwang | 349/114 |
| 2005/0168671 | A1* | 8/2005 | Lee et al. | 349/114 |

\* cited by examiner

*Primary Examiner*—David Nelms
*Assistant Examiner*—David Chung
(74) *Attorney, Agent, or Firm*—MH2 Technology Law Group

(57) ABSTRACT

Transflective display panel and fabrication methods thereof. A substrate with a transmissive area disposed thereon is provided. A planarization layer is deposited on the substrate and a hole is then formed in the planarization layer to expose the transmissive area. A first reflective layer and a second reflective layer are formed on the planarization layer in sequence. An etching process is then performed to pattern the first reflective layer and the second reflective layer to expose the transmissive area. The etching process has a first etching rate to the first reflective layer and a second etching rate to the second reflective layer, which is larger than the first etching rate. A transparent electrode layer is then formed on the second reflective layer and the transmissive area.

25 Claims, 7 Drawing Sheets

TRANSFLECTIVE DISPLAY PANELS AND METHODS FOR MAKING THE SAME

BACKGROUND

The invention relates to display panels, and more particularly, to transflective display (LCD) panels with reflective layer structures.

As manufacturing costs decrease and quality improves, liquid crystal displays are increasingly employed in different products such as notebook computers, personal digital assistants (PDAs), mobile phones, clocks, and the like. Liquid crystal displays are passive luminous devices and can include a backlight unit for LCD devices.

Typically, LCD devices can be divided into several types according to their display methods. Some examples are reflective LCD devices, transmissive LCD devices, and transflective LCD devices. A reflective LCD device saves power and reduces manufacturing costs by reflecting light from the environment to display images. A transmissive LCD device comprises an LCD panel and an additional backlight unit for providing a light source to the LCD panel, leading to higher brightness and less restrictions on use. Additionally, a transflective LCD device, which combines features of the transmissive LCD device and the reflective LCD device, is used because it can reflect ambient light to render images. The transmissive LCD device can also use a backlight unit to actively generate light in a low light environment, such as indoors or at night.

FIG. 1 is a schematic diagram of a conventional transflective display panel 10. As shown in FIG. 1, the transflective display panel 10 comprises a substrate with a plurality of scan lines 12 arranged in a transverse direction, a plurality of data lines 14 arranged in a longitudinal direction perpendicular to the scan lines 12, and a plurality of pixels corresponding to an intersection of each scan line 12 and data line 14. Each pixel comprises a switch region 16 and a display region 18. In the transflective display panel 10, the switch region 16 comprises a thin film transistor, such as a polysilicon thin film transistor. The display region 18 can be covered by a reflective layer with a transmitting hole that forms a transmissive area 114 and a reflective area 115. Thus, ambient light can be reflected by the reflective layer to a display image. A backlight unit can provide an additional light source through the transmissive area 114 to assist image display in a low light environment.

FIG. 2 is a cross-section of the display region 18 along a line A-A' in FIG. 1. As shown in FIG. 2, the transflective display panel 10 comprises a substrate 112 defined with the transmissive area 114 and the reflective area 115 thereon. In conventional fabricating processes for TFT display panels, an inter-layer dielectric (ILD) layer or a planarization layer 116 can be disposed on the substrate 112 to protect electric devices, such as the thin film transistor located in the switch region 16, on the substrate 112. A transmissive hole 118 is formed on the substrate 112 to expose the transmissive area 114.

According to conventional fabricating processes of transflective display panels, a transparent electrode layer and a reflective layer can be formed in different sequences. For example, a structure can be formed with the transparent electrode layer on top or with the reflective layer on top. Since the reflective layer and the transparent electrode layer have different work function, the structure with the reflective layer on top can produce flicker problems, therefore the structure with transparent electrode on top is used as it can provide work function identical, thereby avoiding flicker problems.

As shown in FIG. 2, an adhesion layer 120 and a reflective layer 122 are formed on the planarization layer 116 in sequence. Thereafter, a transparent electrode layer 126 is formed on the reflective layer 122. As previously described, the reflective layer 122 can reflect ambient light to render images. The adhesion layer 120 improves a bonding force between the planarization layer 116 and the reflective layer 122.

An etching process can be performed to pattern the reflective layer 122 and the adhesion layer 120 in the bottom of the transmissive hole 118 to expose the transmissive area 114 prior to formation of the transparent electrode layer 126. Thus, the light source from the backlight unit can transmit through the transmissive area 114.

Typically, the reflective layer 122 is an aluminum alloy and the adhesion layer 120 includes molybdenum (Mo). In the previously described etching process, the adhesion layer 120 has a larger etching rate than the reflective layer 122 due to material properties. This can result in an undercut phenomenon, shown for example as 123 in FIG. 2, to be present in an edge 124 of the adhesion layer 120 adjacent to the transmissive area 114. This can reduce step-coverage of the transparent electrode layer 126 and lead to the presence of a discontinuity region or a weak contact region when the transparent electrode layer 126 is formed thereon. Further, this can deteriorate the display performance of the transflective display panel 10. Thus, a new transflective display panel structure and a fabricating method thereof are desirable.

SUMMARY

In an exemplary embodiment of a method of fabricating a transflective display panel, a substrate with a transmissive area thereon is first provided. A planarization layer is deposited on the substrate and a hole is then formed in the planarization layer to expose the transmissive area. A first reflective layer and a second reflective layer are formed on the planarization layer in sequence. Thereafter, an etching process is performed to pattern the first reflective layer and the second reflective layer to expose the transmissive area. The etching process has a first etching rate to the first reflective layer and a second etching rate to the second reflective layer, which is larger than the first etching rate. A transparent electrode layer is then formed on the second reflective layer and the transmissive area.

An embodiment of a transflective display panel comprises a substrate with a transmissive area defined thereon and a planarization layer disposed on the substrate. The planarization layer has a transmissive hole located on the transmissive area to expose the transmissive area. The transflective display panel further comprises a first reflective layer disposed on the planarization layer with a first opening and a second reflective layer disposed on the first reflective layer with a second opening. The second opening is disposed above the first opening and larger than the first opening. The first reflective layer has a better anti-etching ability than the second reflective layer.

DESCRIPTION OF THE DRAWINGS

The transflective display panel can be more fully understood by reading the subsequent detailed description and examples with references made to the accompanying drawings, wherein.

DETAILED DESCRIPTION

Transflective display panels according to various embodiments are provided. As will be described herein, some embodiments of the reflective layer structures are disposed on a planarization layer of a transflective display panel.

Figure 1:
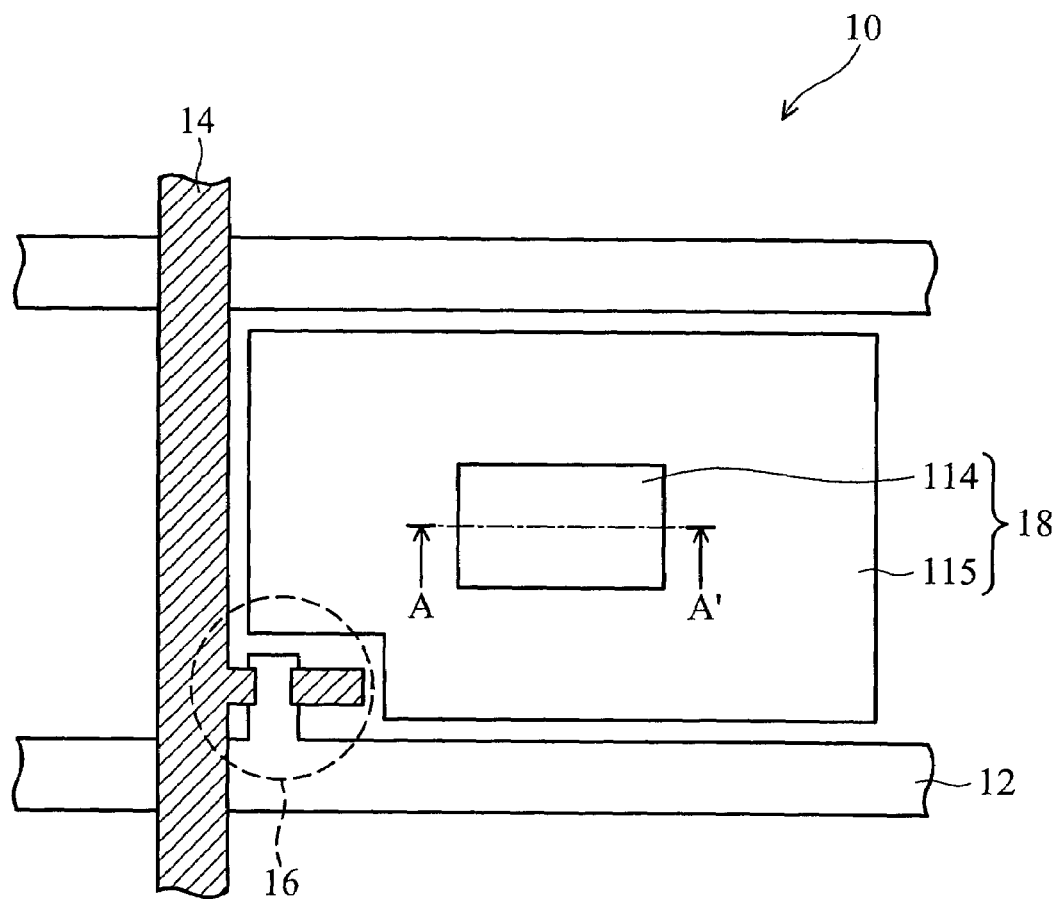
FIG. 1 is a schematic diagram of a conventional transflective display panel.
Figure 2:
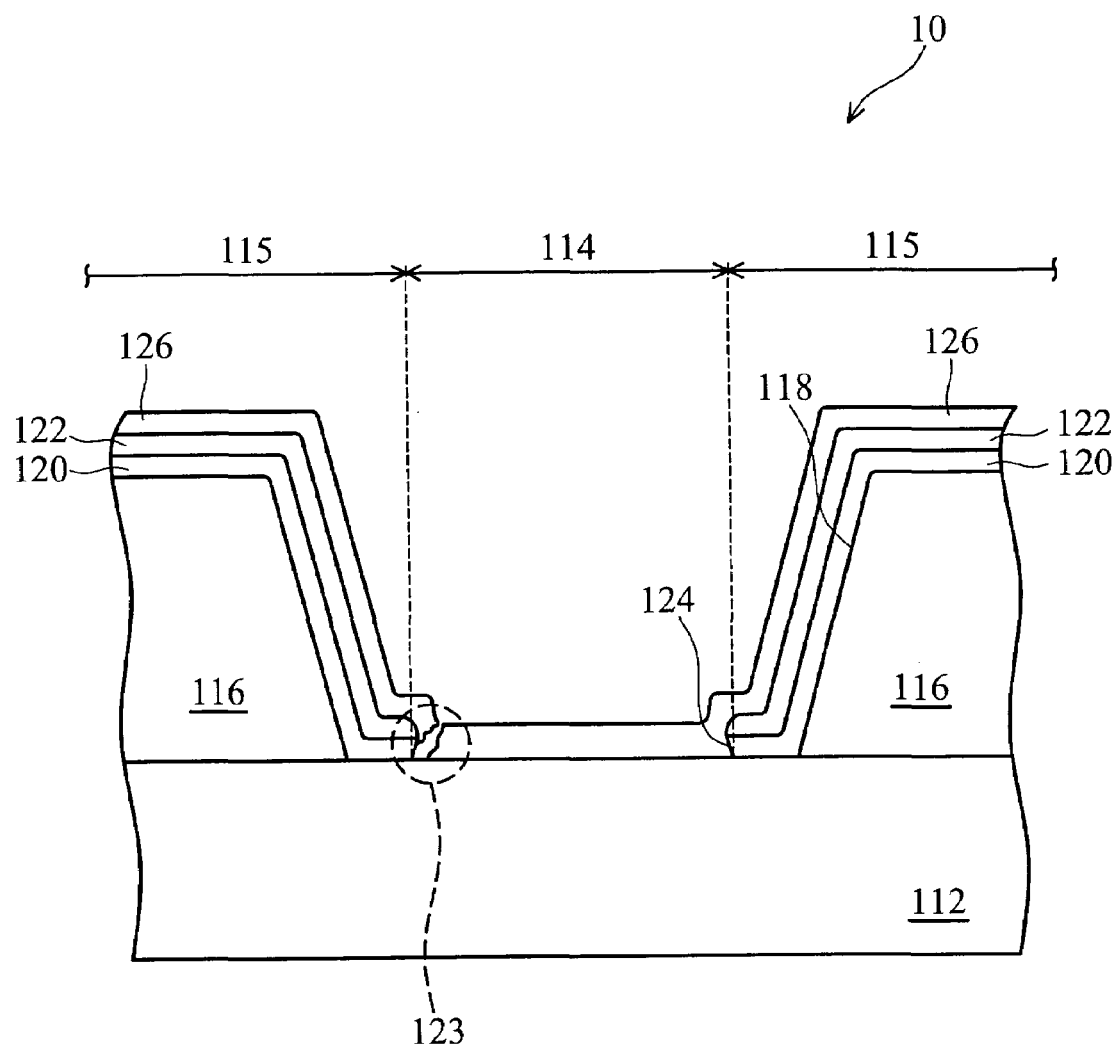
FIG. 2 is a cross-section of the display region along a line A-A' in FIG. 1.
Figure 3:
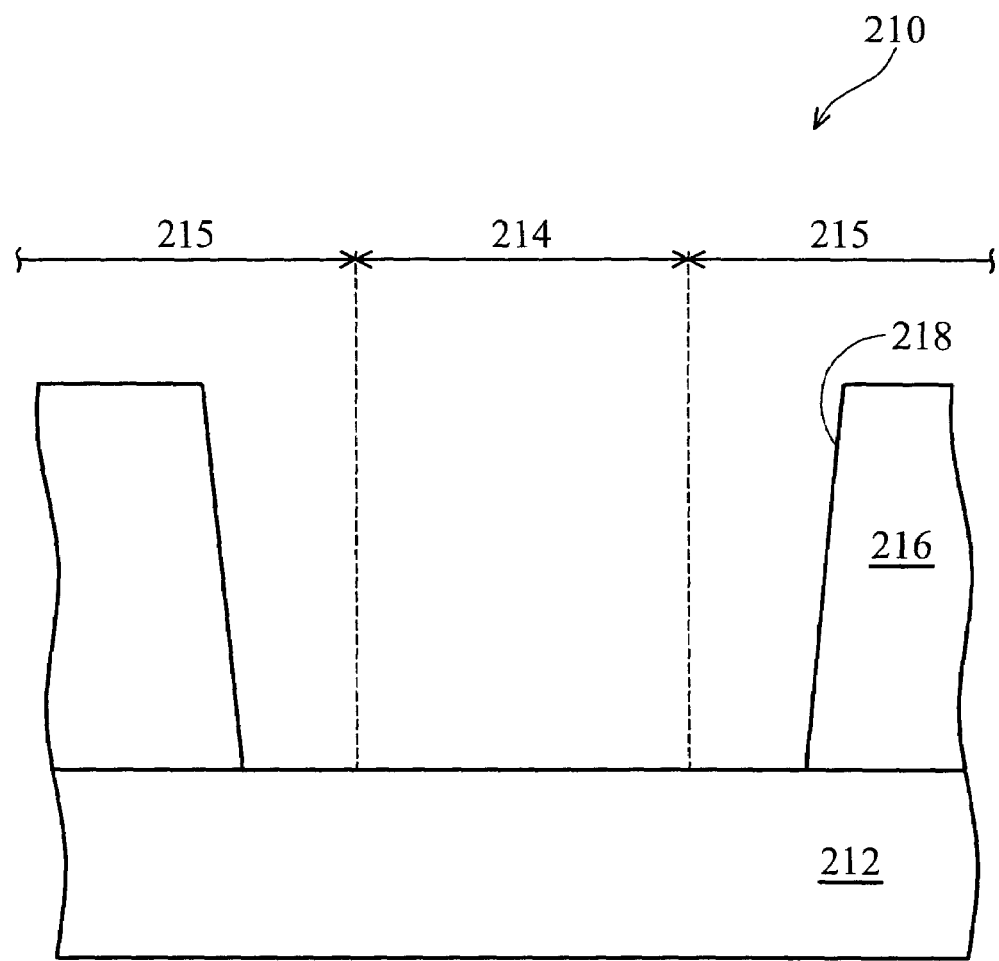
FIG. 3-5 are schematic diagrams of an embodiment of a method of fabricating a transflective display panel.
Figure 4:
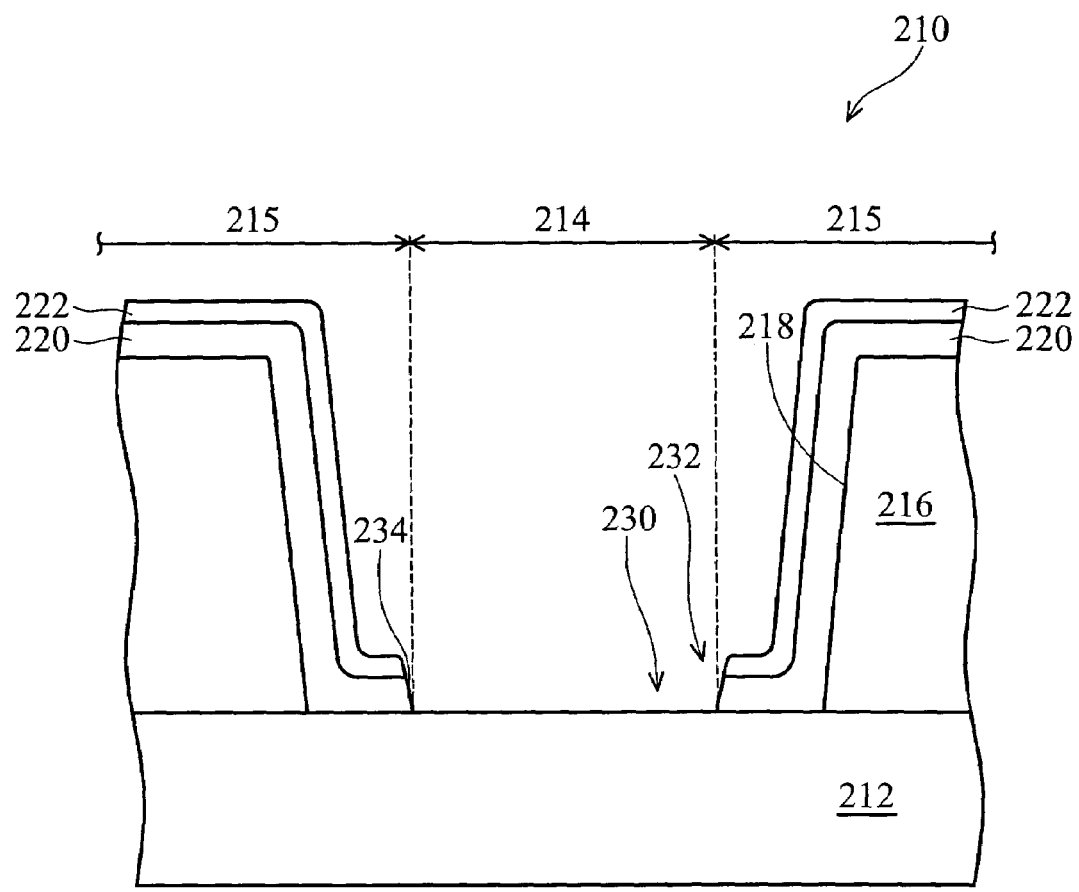
Figure 5:
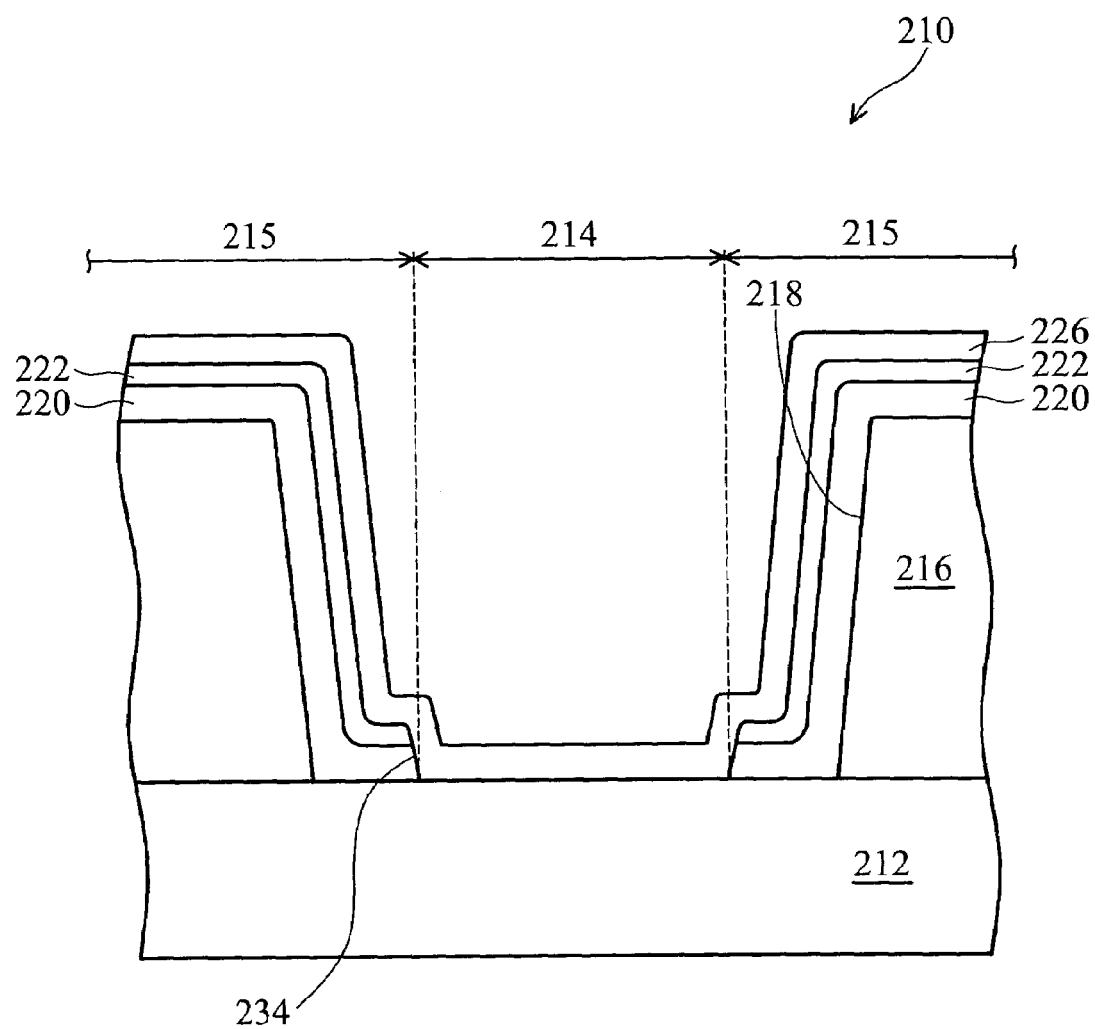

FIG. 3-5 are schematic diagrams according to various embodiments for fabricating a transflective display panel 210. As shown in FIG. 3, the transflective display panel can comprise a substrate 212 with a transmissive area 214 and a reflective area 215 thereon. A planarization layer 216 can be formed on the substrate 212 and then patterned to form a transmissive hole 218 to expose the transmissive area 214 and a part of the reflective area 215. In an embodiment, the substrate 212 can comprise a glass substrate, a silicon substrate, a silicon on insulator substrate, a sapphire substrate, a polymer substrate, or any other suitable material. According to various embodiments, planarization layer 216 can have a thickness of from about 2.9 to about 3.9 micrometers. Further, planarization layer 216 can comprise a dielectric material, such as silicon oxide, silicon nitride, polymer, or a combination thereof.

As shown in FIG. 4, a first reflective layer 220 and a second reflective layer 222 can be formed on the transmissive area 214, the reflective area 215, and on sidewalls of the planarization layer 216 in the transmissive hole 218.

According to various embodiments, the first reflective layer 220 can have a different etch rate than the second reflective layer 222. According to various embodiments, the composition of first reflective layer 220 and second reflective layer 222 can comprise the same or different material. Further, according to various embodiments, first reflective layer 220 and second reflective layer 222 can be formed of the same material but with different densities. In an embodiment of the transflective display panel 210, first reflective layer 220 and second reflective layer 222 can be formed by a sputtering process with different operating powers. For example, greater operating power can be used during fabricating the first reflective layer 222 so the first reflective layer 220 has a relatively porous structure and also a lower anti-etching ability, which can include a slower etching rate.

Thereafter, an etching process is performed to pattern the first reflective layer 220 and the second reflective layer 222 in the transmissive area 214. The etching process forms a first opening 230 in the first reflective layer 220 and a second opening 232, which is disposed above the first opening 230, in the second reflective layer 222 to expose the transmissive area 214. Since the first reflective layer 220 has better anti-etching ability and higher densities, the etching rate of the first reflective layer 220 is relatively lower, such as 50 to 90% of that of the second reflective layer 222, depends on many factors such as type of films, etching chemicals and etching conditions, etc. Thus, the second opening 232 can be formed to be larger than the first opening 232. The edges of the patterned first reflective layer 220 and the patterned second reflective layer 222 in the bottom of the transmissive hole 218 also form a tapered structure 234 with a tapered angle less than 70 degree to improve reliability in subsequent processes. According to various embodiments, a tapered structure 234 with a tapered angle is less than 60 degree.

In an embodiment of the transflective display device 210, the first reflective layer 220 has a thickness of about 1000 to 2000 angstroms and comprises aluminum neodymium (AlNd), aluminum (Al), silver (Ag), aluminum alloy, or combinations thereof. The second reflective layer 222 has a thickness of about 100 to 800 angstroms and comprises aluminum neodymium (AlNd), aluminum (Al), silver (Ag), aluminum alloy, or a combination thereof.

According to various embodiments, the etching process can be performed at a temperature of about 40° C. Further, the etching process can be performed using an etching agent comprising 1-5% nitric acid, 70-80% phosphoric acid, and 5-15% acetic acid. The etching rate of the first reflective layer 220 can be about 4000 to 5000 angstroms per minute, and the etching rate of the second reflective layer 222 can be about 5000 to 6000 angstroms per minute.

As shown in FIG. 5, a transparent electrode layer 226 can then be deposited on the second reflective layer 222 and the transmissive area 214 through the first opening 230 and the second opening 232. In an embodiment of the transflective display panel 210, the transparent electrode layer 226 can comprise indium tin oxide (ITO), indium zinc oxide (IZO), other acceptable materials, or combinations thereof.

Figure 6:
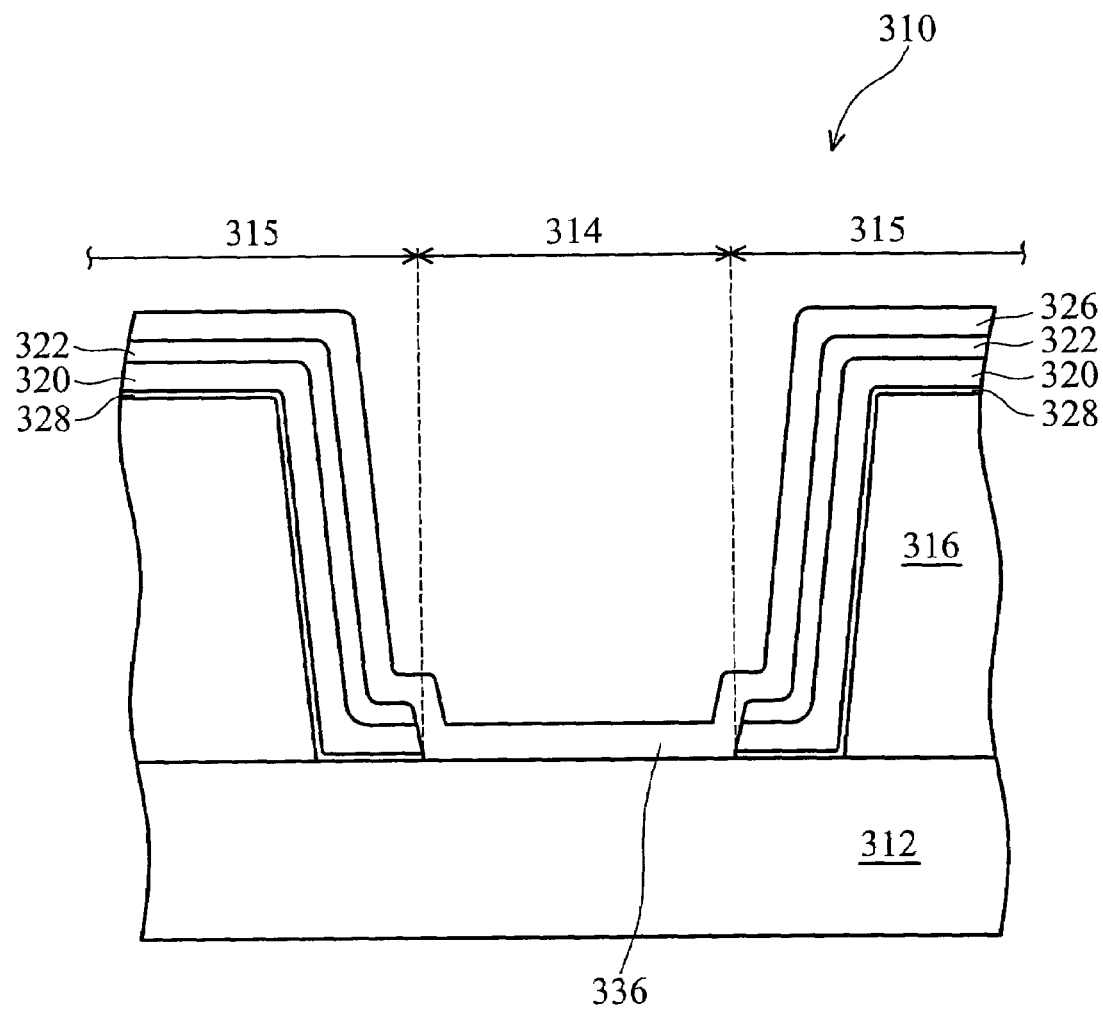
FIG. 6 is a schematic diagram of an embodiment of a transflective display panel.

FIG. 6 is a schematic diagram of an embodiment of a transflective display panel 310. In comparison with the transflective display panel 210, the transflective display panel 310 has a similar structure and fabrication process and further comprises an additional adhesion layer 328. As shown in FIG. 6, the display panel 310 comprises a substrate 312 with a reflective area 315 and a transmissive area 314 and a planarization layer 316 disposed on the substrate 312. The planarization layer 316 has a transmissive hole for exposing the transmissive area 314 on the surface of the substrate 312. An adhesion layer 328, a first reflective layer 320, and a second reflective layer 322 can be formed on the substrate 312 and the planarization layer 316. An etching process can then be performed to pattern the adhesion layer 328, the first reflective layer 320, and the second reflective layer 322. As previously described, the first reflective layer 320 can have a better anti-etching ability than the second reflective layer 322 so the second opening 334 can be larger than the first opening 332 and a tapered structure can be formed. It results in potential improvement of a transparent electrode layer 326 formation in a sequent process. In an embodiment of the transflective display panel 310, the adhesion layer 228 can comprise molybdenum (Mo), titanium (Ti), other suitable materials, or combinations thereof and can have a thickness of about 50 to 300 angstroms.

Figure 7:
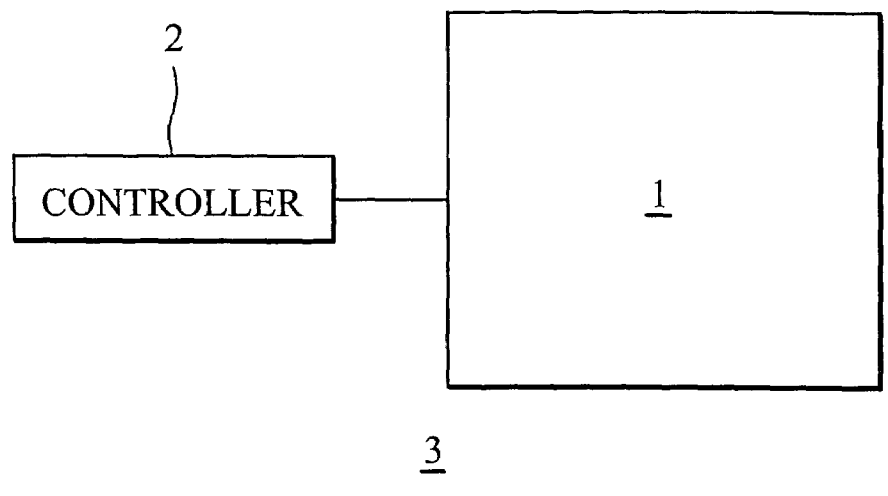
FIG. 7 is a schematic diagram of an embodiment of an LCD device.

According to various embodiments an LCD device can comprise the previously mentioned transflective display panel 210 or 310. FIG. 7 is a schematic diagram illustrating an LCD device 3 comprising an LCD panel 1, such as the previously mentioned display panel 210 or 310. The LCD device 3 can further comprise a controller 2 coupled to the display panel 1. The controller 2 can comprise a driving circuit (not shown) to control the display panel 1 to render images in accordance with an input.

Figure 8:
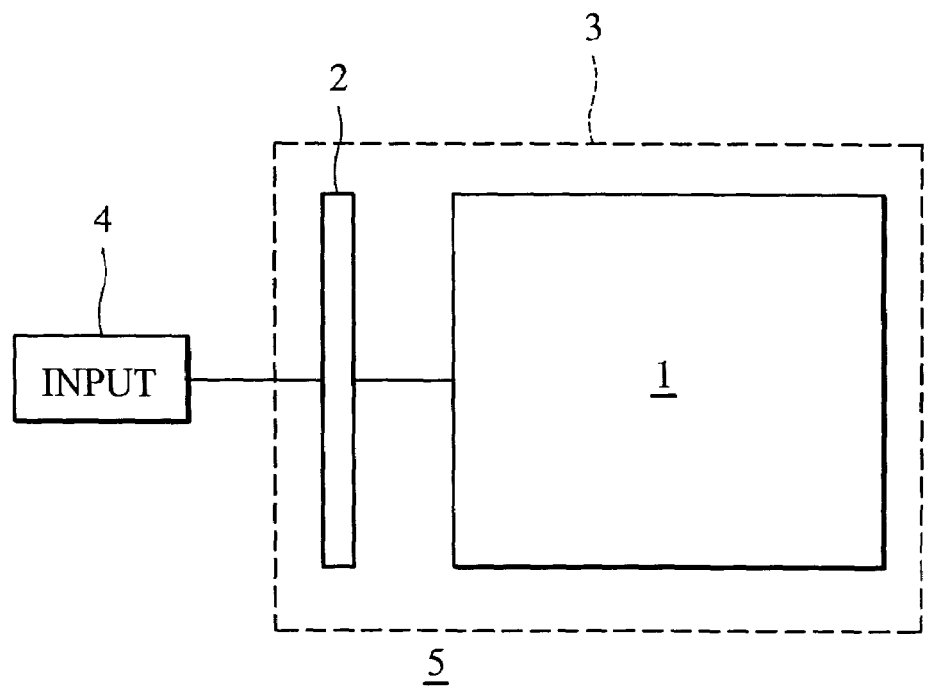
FIG. 8 is a schematic diagram of an embodiment of an electronic device.

FIG. 8 is a schematic diagram illustrating an electronic device 5 incorporating the LCD device 3 shown in FIG. 7. An input device 4 can be coupled to the controller 2 of the LCD device 3 such as that shown in FIG. 5 or FIG. 6 to form an electronic device 5. The input device 4 can include a processor or the like to input data to the controller 2 to render images. The electronic device 5 can be a portable device such as a PDA, notebook computer, tablet computer, cellular phone, or a display monitor device, or non-portable device such as a desktop computer.

When compared with the conventional transflective display panel with only one reflective layer, embodiments layers. Further, the two reflective layers can have different anti-etching properties to form a tapered structure with a small tapered angle. Thus, disconnect or weak contact problems occurring in sequent fabrication processes for the transparent electrode layer can be potentially eliminated. Thus, reliability and stability of the transflective display panels can be potentially improved.

While the invention has been described by way of example and in terms of various embodiments, it is to be understood that the invention is not limited thereto.

What is claimed is:

1. A method of fabricating a transflective display panel comprising:
   providing a substrate with a transmissive area disposed thereon;
   depositing a planarization layer on the substrate;
   forming a hole in the planarization layer to expose the transmissive area;
   forming a first reflective layer on the planarization layer and the exposed transmissive area in the hole;
   forming a second reflective layer on the first reflective layer;
   performing an etching process to pattern the first reflective layer and the second reflective layer in the hole to expose the transmissive area; and
   forming a transparent electrode layer on the second reflective layer and the transmissive area.

2. The method of fabricating a transflective display according to claim 1, wherein the etching processes comprises a first etching rate for the first reflective layer and a second etching rate for the second reflective layer, and wherein the first etching rate is lower than the second etching rate.

3. The method as claimed in claim 2, wherein the first reflective layer and the second reflective layer are formed of the same material.

4. The method as claimed in claim 3, wherein the first reflective layer and the second reflective layer have different densities.

5. The method as claimed in claim 3, wherein the material comprises at least one of aluminum neodymium (AlNd), aluminum (Al), silver (Ag), and aluminum alloy.

6. The method as claimed in claim 1, wherein the first reflective layer and the second reflective layer are formed by a sputtering process.

7. The method as claimed in claim 2, wherein the first etching rate is about 50 to 90% of the second etching rate.

8. The method as claimed in claim 1, wherein the transparent electrode layer comprises at least one of indium tin oxide (ITO), and indium zinc oxide (IZO).

9. The method as claimed in claim 1, wherein the first reflective layer and the second reflective layer in the hole have a taper angle less than 70 degree.

10. The method as claimed in claim 1 further comprising:
    forming an adhesion layer on the planarization layer prior to formation of the first reflective layer, and the first reflective layer is then formed on the adhesion layer.

11. The method as claimed in claim 10, wherein the adhesion layer has a thickness about 50 to 300 angstroms.

12. The method as claimed in claim 10, wherein the adhesion layer comprises at least one of molybdenum (Mo) and titanium (Ti).

13. A transflective display panel comprising:
    a substrate comprising a transmissive area and a reflective area defined thereon;
    a planarization layer disposed on the substrate, the planarization layer having a hole to expose the transmissive area and a part of the reflective area surrounding the transmissive area;
    a first reflective layer disposed on the planarization layer, the first reflective layer having a first opening in the bottom of the hole to expose the transmissive area;
    a second reflective layer disposed on the first reflective layer, the second reflective layer having a second opening above the first opening; and
    a transparent electrode layer disposed on the second reflective layer and the transmissive area.

14. The transflective display panel as claimed in claim 13, wherein the first reflective layer etches slower than the second reflective layer.

15. The transflective display panel as claimed in claim 13, wherein the first reflective layer and the second reflective layer form a tapered shape with a tapered angle less than 70 degree in the bottom of the hole.

16. The transflective display panel as claimed in claim 14, wherein the first reflective layer and the second reflective layer are formed of the same material.

17. The transflective display panel as claimed in claim 16, wherein the first reflective layer and the second reflective layer have different densities.

18. The transflective display panel as claimed in claim 14, wherein the first reflective layer has an etching rate about 50 to 90% of that of the second reflective layer in an etching process of forming the first opening and the second opening.

19. The transflective display panel as claimed in claim 16, wherein the material comprises at least one of aluminum neodymium (AlNd), aluminum (Al), silver (Ag), and aluminum alloy.

20. The transflective display panel as claimed in claim 14, wherein the transparent electrode layer comprises at least one of indium tin oxide (ITO), and indium zinc oxide (IZO).

21. The transflective display panel as claimed in claim 14, further comprising an adhesion layer interposed between the planarization layer and the first reflective layer, the adhesion layer having a third opening under the first opening and the second opening.

22. The transflective display panel as claimed in claim 21 wherein the adhesion layer comprises at least one of molybdenum (Mo) and titanium (Ti).

23. The transflective display panel as claimed in claim 22 wherein the adhesion layer has a thickness about 50 to 300 angstroms.

24. A display device, comprising:
    the transflective display panel as claimed in claim 13; and
    a controller coupled to the display panel to render an image in accordance with an input.

25. An electronic device, comprising:
    the display device as claimed in claim 24; and
    an input device coupled to the controller of the display device to control the display device to render an image.

* * * * *